United States Patent Office 3,348,664
Patented Oct. 24, 1967

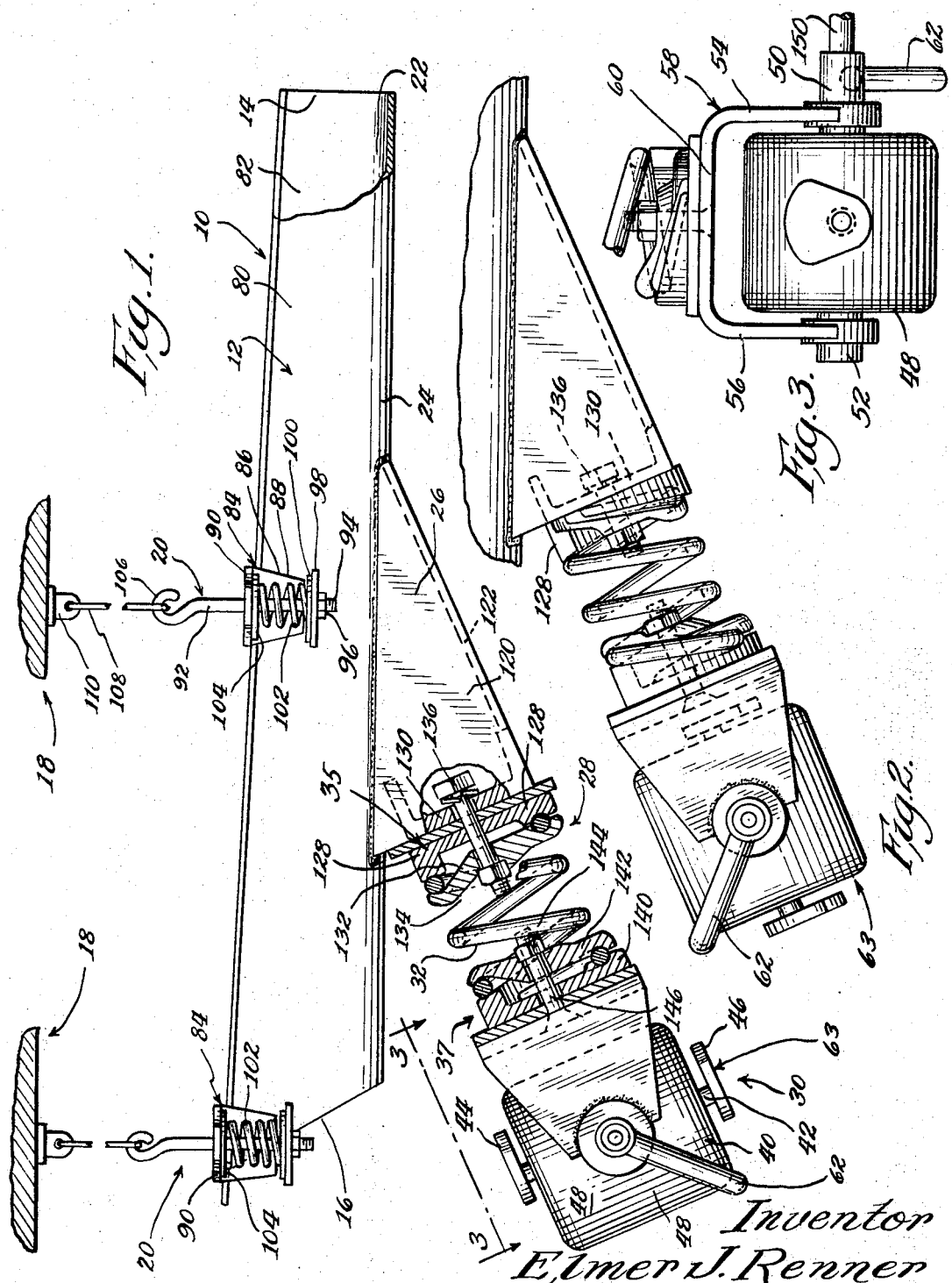

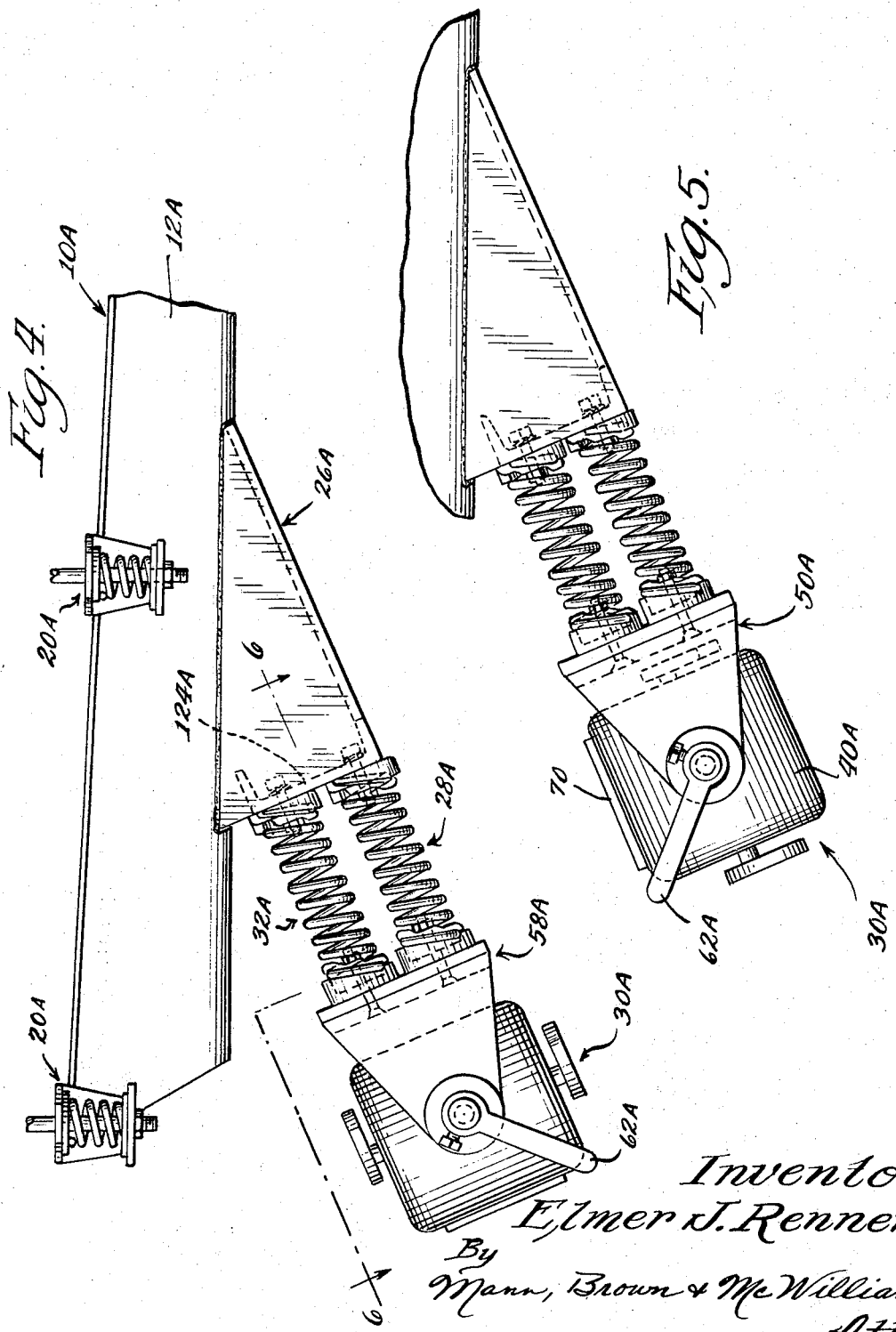

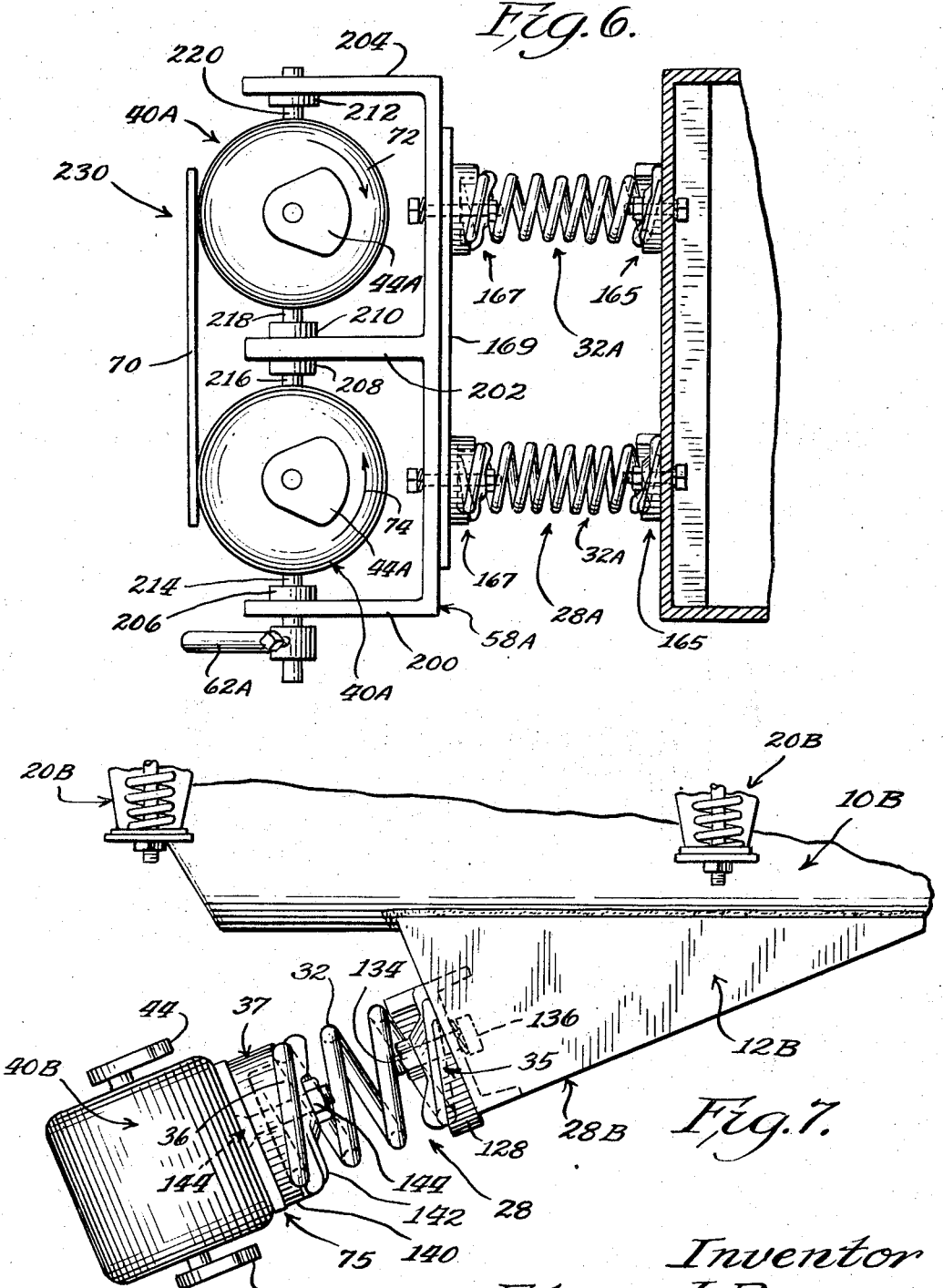

3,348,664
NATURAL FREQUENCY VIBRATING FEEDER
Elmer J. Renner, Aurora, Ill., assignor to Stephens-Adamson Mfg. Co., a corporation of Illinois
Filed Jan. 21, 1966, Ser. No. 522,191
18 Claims. (Cl. 198—220)

ABSTRACT OF THE DISCLOSURE

This invention is directed to a natural frequency vibrating system, such as a vibratory feeder, in which a resiliently supported feeder trough or the like is actuated by an exciter secured thereto through a spring assembly of special characteristics and through which the exciter acts on the trough at a predetermined angle of attack to vibrate the trough under natural frequency conditions, with the spring assembly characteristics being such that the spring rate or K factor of the spring assembly in the direction of said angle of attack is substantially equal to or greater than twice the spring rate or K factor of the spring assembly in a direction normal to said angle of attack. The spring assembly includes a helical spring, in this case a coil spring, and the assembly forms the sole support for the exciter, and in several of the disclosed forms, the exciter includes an arrangement for varying the feed rate of the feeder, which in the forms illustrated includes a motor for the exciter that is mounted for tilting movement with respect to said angle of attack, while in one form disclosed the motor has a fixed mount.

My invention relates to a natural frequency vibrating system, such as a vibratory feeder, and more particularly, to vibrating feeders of the natural frequency type that are adapted to convey particulate material, as from a hopper to a point of use.

The principal object of the invention is to provide a natural frequency vibratory feeder or the like in which the exciting force is supplied by a motor carrying one or more rotating unbalanced weights, with the motor being supported on the feeder trough by a spring assembly which is characterized by having a spring rate or K factor in one direction, here identified as the angle of attack, which is two or more times the spring rate or K factor of the spring assembly in the direction normal to the angle of attack, and in which the said spring assembly has a natural frequency in the direction of said angle of attack which is slightly above the frequency of the exciter. The result is that the unbalanced weights deliver pulsations to the trough through the spring assembly with natural frequency amplification in the direction of said angle of attack, but the components of force derived from the exciter which are transverse to said angle of attack are absorbed by the said spring assembly.

A further object of the invention is to provide a simple means for varying the feed rate of a feeder in which the exciter is mounted on the trough, or driven member, in the manner described above and this is accomplished by providing a trunnion mount for the motor with the axis of the trunnion being normal to the said angle of attack. If a single motor with eccentric weights is used with this tiltable mount, all components of the exciter force which are not coaxial with or parallel to the angle of attack are subjected to the dampening action of the lower transverse K factor of the spring assembly. If two motors are used to provide the exciter force with the motors mounted with their shafts parallel and in a trunnion mount transverse to the axis of the angle of attack, and the shafts of the motors are rotated in opposite directions, such an arrangement provides an automatic cancelling action of lateral forces on the spring assembly when the motors are rotated to their maximum feed rate position.

Other objects of the invention are to provide a two mass, free body, resonant system type feeder in which the feed rate may be varied by varying the position of the exciter with respect to the feed trough; to provide a two mass, free body, resonant system type feeder in which helical springs provide the sole force transmitting connection between the feeder trough and the exciter; and to provide a natural frequency vibrating feeder that is economical of manufacture, convenient to install and use and readily adapted to handle a wide variety of particulate bulk materials.

Other objects, uses, and advantages will be obvious or become apparent on consideration of the detailed description and the application drawings.

In the drawings:

FIGURE 1 is a side elevational view illustrating one embodiment of the invention, showing the feeder adjusted for maximum throw or feed rate;

FIGURE 2 is a fragmental side elevational view of the exciter and spring assembly shown in FIGURE 1, but showing the exciter positioned at the zero throw or feed rate position;

FIGURE 3 is a fragmental view taken substantially along line 3—3 of FIGURE 1;

FIGURE 4 is a view similar to that of FIGURE 1 illustrating a modified form of the invention showing the feeder adjusted for maximum throw or feed rate;

FIGURE 5 is a fragmental side elevational view of the exciter and spring suspension assembly of the form of FIGURE 4, showing the exciter positioned in zero throw or feed rate position;

FIGURE 6 is a diagrammatic fragmental view taken substantially along line 6—6 of FIGURE 4; and FIGURE 7 is a fragmental side elevational view illustrating a further modified form of the invention in the form of a fixed rate feeder.

However, it is to be distinctly understood that the specific drawing illustrations provided are supplied primarily to comply with the requirements of the patent code and that the invention may be embodied in other specific arrangements that will be obvious to those skilled in the art.

General description

Reference numeral 10 of FIGURE 1 generally indicates one embodiment of my invention comprising a trough 12, having an open discharge end at 14 and a closed rear end 16, suspended from a suitable fixed support indicated at 18 by suitable resilient spring devices 20.

The trough 12, which may be considered a first mass of a two mass vibratory system, further comprises a feed conveying surface 22, and fixed to the undersurface 24 of the trough is an angular spring seat structure 26 which has secured thereto a spring assembly 28 that carries an exciter device 30 for vibrating the trough along a line coincidental with or parallel to the longitudinal axis of the spring assembly, which line defines the angle of attack for the force applied to the trough.

In the form of the invention shown in FIGURES 1 to 3, the spring assembly 28 comprises a single coil spring 32 having its upper end secured to the spring seat structure 26 and its lower end secured to the bracket of the exciter device 30 by clamping devices such as indicated at 37. The longitudinal axis of the coil spring 32 is sometimes hereinafter referred to as "the angle of attack axis."

In accordance with this invention, spring 32 has a spring rate (pounds per inch of deflection, sometimes called "K factor," or stiffness) axially thereof (i.e., of the angle of attack) that exceeds its spring rate laterally thereof by a K factor that is substantially equal to, or in excess of 2. In other words, the spring rate or K factor of spring 32 laterally thereof should be equal to approximately one-half or less of the K factor of spring 32 axially thereof. I have found that by employing this relationship of axial and lateral spring rates in the spring 32, an exciting force resulting from circular motion of eccentric weight, when given a frequency that is slightly less than or approaches the natural frequency of the spring assembly system in the direction of the angle of attack, will produce the desired amplification of the components of the exciting force acting axially of spring 32, while at the same time the components of the exciting force that act laterally of the spring will be absorbed or dampened.

The exciter device 30 in the form shown comprises a constant speed motor 40 which drives a shaft 42 having eccentrically positioned weights 44 and 46 keyed to the opposite ends thereof, with the eccentric weights 44 and 46 being disposed in the same relative position about the axis of the shaft 42. However, other conventional motor arrangements provided with one or more eccentrically disposed weights could be adapted to serve as exciter 30.

The motor 40 includes the housing structure 48 provided in the form shown with stub shafts in trunnions 50 and 52 that are journalled in the respective arms 54 and 56 of U-shaped mounting bracket 58 that has its web 60 directly connected to the end 36 of helical spring 32.

Fixed to the stub shaft 50 is an operating handle 62 for pivoting the motor 40 about the axes of the stub shafts 50 and 52 to vary the position of the motor and its rotating eccentrics from the maximum throw position of FIGURE 1 to the zero throw position of FIGURE 2.

Further in accordance with this invention, the feeder is operated under natural frequency conditions, and in the illustrated embodiment, the motor 40 operates at an r.p.m. on the order of 1800, and the resiliently supported trough 12, the spring assembly 28 and the exciter device form a resonant system having a natural frequency in the direction of the angle of attack which is preferably slightly above the r.p.m. of the motor 40, for instance 1900 cycles per minute.

It will be noted that the motor 40 comprising the exciter device 30 and forming exciter 63 in the form illustrated rotates or is pivotally or trunnion mounted for movement about a horizontal axis and in a vertical plane that extends longitudinally of the trough and of the longitudinal axis of the spring 32. Also, the shaft 42 and its eccentrics 44 and 46 rotate about an axis that lies in the plane of pivotal movement of the motor 40. While this orientation of parts serves to minimize the starting torque requirements of motor 40 by reducing the amount of lift required to pick up the eccentric weights 44 and 46 from rest, the pivotal axis of motor 40 may also be at right angles to the position shown in the drawings or at any position between that position and the position illustrated and still achieve the significant improvements contemplated by this invention. Thus, assuming the right angled position indicated, the pivotal axis of motor 40 would then be disposed in the vertical plane that extends longitudinally of and coincides with the longitudinal axis of the feeder, and the motor 40 would thus pivot about in an inclined plane aligned with the longitudinal axis of spring assembly 28 which would also extend generally longitudinally of the feeder.

In the embodiment 10A of FIGURES 4–6, the trough 12A and its resilient suspension devices 20A are essentially the same as shown in FIGURE 1. However, in this embodiment of the invention, the coil spring assembly 28A comprises a plurality of coil springs (four in the arrangement there illustrated) that are arranged so that the assembly 28A has the axial and lateral spring rate or K factor relation above described; the exciter device 30A comprises a pair of motors 40A journalled in a bracket structure 58A that is similar to that of FIGURES 1–3, with the motors 40A being joined together by a brace plate 70 for simultaneous adjustment movement. The motors 40A are wired in any suitable manner to rotate their respective eccentrics in opposite directions, as indicated by the arrows 72 and 74, respectively (see FIGURE 6).

In this embodiment of the invention, handle 62A is operated to vary the position of the exciter device between the respective operating positions shown in FIGURES 4 and 5, respectively.

In the embodiment 10B of FIGURE 7, the trough 12B and its resilient suspension devices 20B are esentially the same as shown in FIGURE 1, as are spring assembly 28B and motor 40B, However, in this embodiment of the invention the motor 40B is fixedly mounted in its maximum throw position on mounting plate 75, which makes feeder 10B a fixed rate feeder.

It will thus be seen that in accordance with my invention, the helical spring assembly forms the sole support for the exciter device, and the exciter device comprises a rotated eccentric weight which, in the forms of FIGURES 1–6 may be pivoted with respect to the longitudinal axis of the spring assembly to vary the throw of the feeder from maximum to zero.

Moreover, the spring rate relationship of the helical spring assemblies of all the illustrated embodiments change the circular motion exciting force provided by motor 40 to a rectilinear resultant force acting in a plane that parallels the axis of the spring assembly, thereby insuring that the only motion imparted to the feeder is in the throwing direction desired.

*Specific description*

The trough 12 itself may have any shape now employed in connection with vibrating feeders and conveyors, and in the specific embodiments shown, the trough in addition to the open discharge end 14 and the closed rear end 16 includes upstanding side walls 80 and 82, each of which is provided with a pair of brackets 84 that cooperate with the respective resilient suspension devices 20 to suspend the trough 12 from the fixed support 18.

The bracket devices 84 each comprise an angled shaped bracket 86 having one portion 88 thereof affixed to the trough side wall and the other angular portion 90 thereof substantially horizontally disposed and formed with a suitable opening through which extends the eye-bolt 92 of each spring device 20. The eye-bolts 92 at their lower ends are provided with a threaded portion 94 on which is threaded a suitable nut 96 that supports washer 98 and spring seat 100 against which bear the respective compression spring 102 that at their other ends bear against suitable spring seat 104 that engage the respective bracket portions 90.

The eye-bolts 92 each are provided with an eye portion 106 which respectively receive supporting links 108 that are in turn suspended from suitable bracket structures 110 affixed or suitably connected to the fixed support 18, the latter being only diagrammatically illustrated.

The spring seat structure 26 of the trough 12 comprises a pair of triangular side plates 120 (only one is illustrated but the second side plate is on the opposite side of the trough 12 in the position shown in FIGURE 1) suitably fixed as by welding to brace plate 122 and the channel member 124 to which the end 34 of the spring 32 is connected.

The clamp device 35 comprises a suitable spring seat 128 against which the spring 34 sits, and which engages against the web 130 of the channel member 124, with the spring end 34 being clamped in place by appropriate clamping element 132 held in place by suitable nut 134 that is received on bolt 136 that passes through the channel member web 130 and the clamping member 134.

The clamping device 37 is similar to the clamping device 35 and comprises a suitable spring seat 140 with the spring end 36 being held in place by suitable clamping member 142 held in place by a nut 144 received on bolt 146 which passes through the member 142 and the web portion of the exciter device bracket structure 58.

The spring seat structure 26 should be shaped so that the longitudinal axis of spring 32 makes an angle lying in the range of from about 15 to about 40 degrees with respect to the feed surface 22 of the trough 12. Also, the spring 32 should be sufficiently stiff to support the exciter device 30 without any substantial deflection of the exciter device from alignment with the longitudinal axis of the spring 32, and its longitudinal axis should pass through the center of gravity of feeder 10.

The motor 40 may be wired in any suitable manner, but in the form illustrated, the wiring 150 is connected to the motors through the stub shaft 50 which is tubular in configuration.

In the form of the invention shown in FIGURES 4-6, the trough 10A and the suspension device 28A are substantially the same as shown in FIGURE 1, as is the spring seat structure 26A.

However, the coil spring assembly 28A comprises four helical springs 32A positioned between the channel member 124A and the exciter mounting bracket 58A to act in parallel between the exciter and the trough. The respective springs 32A are secured in place by employing clamp devices 165 and 167 that are similar to devices 35 and 37, and springs 32A are oriented transversely of assembly 28A so that the central longitudinal axis 179 of assembly 28A passes through the center of gravity of feeder 10A. Clamp devices 167 are connected together by brace plate 169.

The exciter bracket device 58A is provided with three flange elements 200, 202 and 204 (see FIGURE 6) which respectively support bearing structures 206, 208, 210 and 212 that respectively journal stub shafts 214, 216, 218 and 220. The stub shafts 214 and 216 are affixed with respect to the right hand motor 40A (of FIGURE 6) while the stub shafts 218 and 220 are affixed with respect to the other motor 40A. Stub shaft 214 extends outwardly of the bracket flange 200 and has operating handle 62A affixed thereto for simultaneously turning the motors 40A between the two extreme positions shown in FIGURES 4 and 5, respectively, to change or vary the throw of the trough 12A. The motors 40A may be wired in any suitable manner as by making stub shafts 214, 216, 218 and 220 tubular for reception of suitable wiring, and the motors 40A and their eccentrics form adjustable exciter 230.

The embodiment of FIGURE 7 shows the invention in its simplest form. This embodiment is the same as that of FIGURES 1-3 except that motor 40B is affixed to the mounting plate 75 instead of being adjustably mounted. Mounting plate 75 in the form shown takes the form of the underside of spring seat 140 of clamping device 37. The embodiment of FIGURES 4-6 may be made a fixed rate feeder by similarly fixing motors 40A to brace plate 169 in their operating positions of FIGURE 4 and eliminating mounting bracket 58A.

The natural frequency of spring assembly 28 and its equivalents herein disclosed may be calculated by the well known formula for simple spring and weight combinations, which is $N_f = 187.6\sqrt{K/W}$, where $N_f$ is natural frequency of the system, K is the spring factor (pounds per inch of deflection) and W is the weight supported by the spring.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. A vibrating feeder comprising:
a trough,
means for resiliently supporting said trough,
a spring assembly connected at one end thereof to said trough at an acute angle with respect to the trough, thereby defining an angle of attack direction,
and an exciter device carried by the other end of said spring assembly,
said trough, said spring assembly and said exciter device forming a vibratory system,
said exciter device including a rotatable eccentric mounted to rotate about an axis lying in a plane that extends generally longitudinally of the trough, and motor means for rotating said eccentric at a speed approximating the resonant frequency of said system in said angle of attack direction,
said spring assembly including a helical spring having its two ends connected respectively to the trough and to the exciter device and having its central axis in said angle of attack direction;
said spring assembly having a spring rate laterally thereof that is substantially equal to or less than half its spring rate axially thereof, and said spring assembly constituting the sole support for said exciter device.

2. The feeder set forth in claim 1 wherein:
said exciter device comprises a single motor unit.

3. The feeder set forth in claim 1 wherein:
said exciter device comprises a dual motor unit each including a rotatable eccentric,
and wherein said motor means rotates said eccentrics in opposite directions.

4. A vibrating feeder comprising:
a trough having a feed discharge end,
a helical spring assembly connected at one end thereof to said trough at an acute angle with respect thereto,
said spring assembly being directed in the direction of said trough discharge end upwardly of said trough thereby defining an angle of attack direction,
and an exciter device carried by the other end of said spring assembly,
said trough, said assembly, and said exciter device forming a vibratory system,
said exciter device including a rotatable eccentric mounted to rotate about an axis lying in a plane that extends generally longitudinally of said trough, and motor means for rotating said eccentric at a speed approximating the resonant frequency of said system in said angle of attack direction,
said spring assembly including a helical spring interconnecting the trough and the exciter device,
said spring assembly having a spring rate laterally of said angle of attack direction that is substantially equal to or less than half of its spring rate in said angle of attack direction and said spring assembly constituting the sole support of said exciter device.

5. The feeder set forth in claim 4 wherein:
said motor means has an r.p.m. on the order of 1800, and said system has a resonant frequency in the direction of said angle of attack that is on the order of 1900 cycles per minute.

6. The feeder set forth in claim 4 wherein:
said spring assembly comprises a plurality of helical spring members acting in parallel between said trough and said exciter member.

7. The feeder set forth in claim 4 wherein:
said exciter device is mounted on said spring assembly for pivotal movement in a plane that extends generally longitudinally of said trough,
and including means for pivoting said exciter device between a position wherein said rotatable eccentric axis extends parallel to said spring assembly and a position wherein the said axis extends transversely of said assembly to vary the throw of said trough between a maximum and zero.

8. The feeder set forth in claim 7 wherein:
the second mentioned position intersects said trough along its longitudinal axis.

9. The feeder set forth in claim 7 wherein:
the second mentioned position intersects said trough transversely thereof.

10. The feeder set forth in claim 7 wherein:
said spring assembly comprises a single helical spring member extending between the trough and the exciter device,
with said plane of pivotal movement of said exciter device passing through the longitudinal axis of said spring member.

11. The feeder set forth in claim 7 wherein:
said exciter device includes a second rotatable eccentric mounted to rotate about an axis that parallels the axis of the first mentioned eccentric,
said axes being disposed on either side of the longitudinal center of said trough,
and including motor means for rotating the second mentioned eccentric at the speed of the first mentioned motor means,
said first mentioned motor means and the second mentioned motor means rotating said eccentrics in opposite directions.

12. A vibrating material handling arrangement comprising:
a particulate material handling member to be vibrated,
means for resiliently supporting said member, an exciter device carried by said member,
and a spring assembly connecting said exciter device to said member and constituting the sole support thereof for transmitting to said member forces generated by said exciter device and acting to vibrate said member in a predetermined direction,
said member, said spring assembly, and said exciter device forming a vibratory system,
said exciter device including means for vibrating said member with an eccentric rotating mass through said spring assembly at speeds approximating the resonant frequency of said system in said direction,
said spring assembly having a spring rate laterally of said direction that is substantially equal to or less than half its spring rate longitudinally of said direction.

13. The arrangement set forth in claim 12 wherein:
said exciter device vibrating means includes a rotatably mounted eccentric and motor means for rotating said eccentric to generate said forces,
and including means for selectively varying the amplitude of vibration of said member.

14. In a vibratory feeder,
a trough supported for vibration as a free mass,
motor means including a rotating eccentric mass for delivering vibratory impulses to the trough along a line providing a given angle of attack,
and one or more coil spring means interconnecting the trough and the motor means and constituting the sole support for the motor means,
said coil spring means having a spring rate along the line of said angle of attack that is substantially equal to or more than about twice the spring rate of said coil spring means in a direction transverse to the line of said angle of attack.

15. The feeder set forth in claim 14 including:
means for varying the amplitude of the vibratory forces directed along the line of said angle of attack.

16. A vibratory mass system comprising:
a first mass;
a second mass which includes an exciter device having a rotatable eccentric mounted for rotation to produce centrifugal forces with components of a given frequency along a given angle of attack axis;
a spring assembly means interconnecting the two masses for transmitting said force components from the second mass to the first mass and constituting the sole means for supporting the one mass upon the other, said spring assembly means including a helical spring having its two ends connected respectively to the two masses and having its central axis in the direction of said angle of attack axis;
said spring assembly means having a spring rate in the direction of said angle of attack axis that is approximately two or more times greater than the spring rate of the spring assembly means in a direction normal to said angle of attack axis;
said spring assembly means being further characterized by having its spring rate in the direction of said angle of attack axis slightly greater than the frequency of said components of force.

17. A vibratory mass system as set forth in claim 16 in which means are provided for varying the magnitude of the components of centrifugal force which act along said given angle of attack axis.

18. A vibratory mass system as set forth in claim 16 which includes means for adjusting an angle of the axis of the rotatable eccentric with respect to said angle of attack axis to thereby vary the magnitude of said force components acting along said angle of attack axis.

References Cited

UNITED STATES PATENTS

| | | | |
|---|---|---|---|
| 2,902,867 | 9/1959 | Hedstrom | 74—61 |
| 3,112,653 | 12/1963 | Morris | 198—220 |
| 3,251,457 | 5/1966 | Dumbaugh | 198—220 |

FOREIGN PATENTS

| | | |
|---|---|---|
| 847,940 | 9/1960 | Great Britain. |

EVON C. BLUNK, *Primary Examiner.*

EDWARD A. SROKA, *Examiner.*